(12) United States Patent
Gonzalez Medina et al.

(10) Patent No.: US 11,799,271 B2
(45) Date of Patent: Oct. 24, 2023

(54) SPARK PLUG CONFIGURATIONS WITH ELECTRODE TO DIRECT CHARGE FLOW FOR A COMBUSTION PRE-CHAMBER OF AN INTERNAL COMBUSTION ENGINE

(71) Applicant: Cummins Inc., Columbus, IN (US)

(72) Inventors: David Guillermo Gonzalez Medina, Columbus, IN (US); William Marshall Cover, Columbus, IN (US); Xu Han, Columbus, IN (US); Andrew Guy Kitchen, Daventry (GB); Daniel J. O'Connor, Columbus, IN (US); Alan C. Anderson, Columbus, IN (US); Nicholas James Welch, Greenwood, IN (US); Jisang Sun, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/175,813

(22) Filed: Feb. 15, 2021

(65) Prior Publication Data

US 2021/0184437 A1    Jun. 17, 2021

Related U.S. Application Data

(63) Continuation of application No. PCT/US2019/052935, filed on Sep. 25, 2019.

(60) Provisional application No. 62/736,560, filed on Sep. 26, 2018.

(51) Int. Cl.
*H01T 13/46* (2006.01)
*H01T 13/32* (2006.01)

(52) U.S. Cl.
CPC .......... *H01T 13/467* (2013.01); *H01T 13/32* (2013.01)

(58) Field of Classification Search
CPC ....... H01T 13/32; H01T 13/46; H01T 13/467; H01T 13/54
See application file for complete search history.

(56) References Cited

U.S. PATENT DOCUMENTS

| 2,391,458 A | 12/1945 | Hensel |
| 2,439,590 A | 4/1948 | Tognola |
| 4,484,101 A * | 11/1984 | Ibbott .................... H01T 13/32 |
| | | 313/142 |

(Continued)

FOREIGN PATENT DOCUMENTS

| EP | 0758152 | 2/1997 | |
| JP | WO8101918 A1 * | 7/1981 | ........... H01T 13/467 |

(Continued)

OTHER PUBLICATIONS

Machine translation of KR-20030027501-A, retrieved from worldwide.espacenet.com on Mar. 22, 2022 (Year: 2022).*

(Continued)

*Primary Examiner* — Andrew J Coughlin
*Assistant Examiner* — Steven Y Horikoshi
(74) *Attorney, Agent, or Firm* — Taft Stettinius & Hollister LLP (57) ABSTRACT

Spark plugs are disclosed that include electrode arrangements to improve the charge flow into and out of the annular volume around the insulator nose and a pre-chamber volume of a pre-chamber device, thus directing a purge of exhaust gases trapped in the annular volume to a space formed by the exterior of the spark plug body and the interior of the pre-chamber device.

14 Claims, 5 Drawing Sheets

(56) References Cited

U.S. PATENT DOCUMENTS

| | | | |
|---|---|---|---|
| 5,189,333 A | | 2/1993 | Kagawa et al. |
| 5,280,214 A | * | 1/1994 | Johnson .................. H01T 13/32 |
| | | | 313/139 |
| 5,369,328 A | * | 11/1994 | Gruber .................... H01T 13/39 |
| | | | 313/140 |
| 5,623,179 A | | 4/1997 | Buhl |
| 5,736,809 A | | 4/1998 | Matsutani et al. |
| 6,362,562 B1 | * | 3/2002 | Rossi .................... H01T 13/467 |
| | | | 313/143 |
| 7,637,793 B2 | | 12/2009 | Lintunen et al. |
| 7,659,655 B2 | | 2/2010 | Tozzi et al. |
| 8,125,130 B2 | | 2/2012 | Martin et al. |
| 9,088,137 B2 | | 7/2015 | Farrell et al. |
| 9,166,378 B2 | | 10/2015 | Alfonso et al. |
| 2002/0055318 A1 | * | 5/2002 | Ishiguro .................. H01T 21/02 |
| | | | 445/7 |
| 2007/0252502 A1 | * | 11/2007 | Wang ...................... H01T 13/32 |
| | | | 313/141 |
| 2008/0088216 A1 | * | 4/2008 | Kim ........................ H01T 13/32 |
| | | | 313/141 |
| 2012/0125279 A1 | | 5/2012 | Hampson et al. |
| 2016/0141840 A1 | * | 5/2016 | Matsunaga ............. H01T 13/32 |
| | | | 313/139 |
| 2017/0187170 A1 | * | 6/2017 | Sumoyama ............. H01T 13/39 |
| 2017/0237236 A1 | * | 8/2017 | Terada .................... H01T 13/40 |
| | | | 313/120 |
| 2019/0284988 A1 | | 9/2019 | Anderson et al. |

FOREIGN PATENT DOCUMENTS

| | | | |
|---|---|---|---|
| KR | 20030027501 A | * | 4/2003 |
| WO | 2018106924 | | 6/2018 |

OTHER PUBLICATIONS

Dictionary definition of Proximal, retrieved from dictionary.com on Jun. 27, 2022 (Year: 2022).*

Dictionary definition of Distal, retrieved from dictionary.com on Jun. 27, 2022 (Year: 2022).*

Chiu et al., Effects of Disturbed Flow on Vascular Endothelium: Pathophysiological Basis and Clinical Perspectives, Physiol Rev. Jan. 2011 (Year: 2011).*

Search Report and Written Opinion, PCT Appln. No. PCT/US19/52935, dated Feb. 6, 2020. 11 pgs.

* cited by examiner

Fig. 1

(PRIOR ART)

Fig. 2

(PRIOR ART)

SPARK PLUG CONFIGURATIONS WITH ELECTRODE TO DIRECT CHARGE FLOW FOR A COMBUSTION PRE-CHAMBER OF AN INTERNAL COMBUSTION ENGINE

CROSS-REFERENCE TO RELATED APPLICATION

The present application is a continuation of International Patent Application No. PCT/US19/52935 filed on Sep. 25, 2019, which claims the benefit of the filing date of U.S. Provisional Application Ser. No. 62/736,560 filed on Sep. 26, 2018, each of which are incorporated herein by reference.

TECHNICAL FIELD

The subject matter of this application relates generally to internal combustion engines, and more specifically to spark plugs used in ignition systems of internal combustion engines having combustion pre-chambers for the spark plugs.

BACKGROUND

Figure 1:
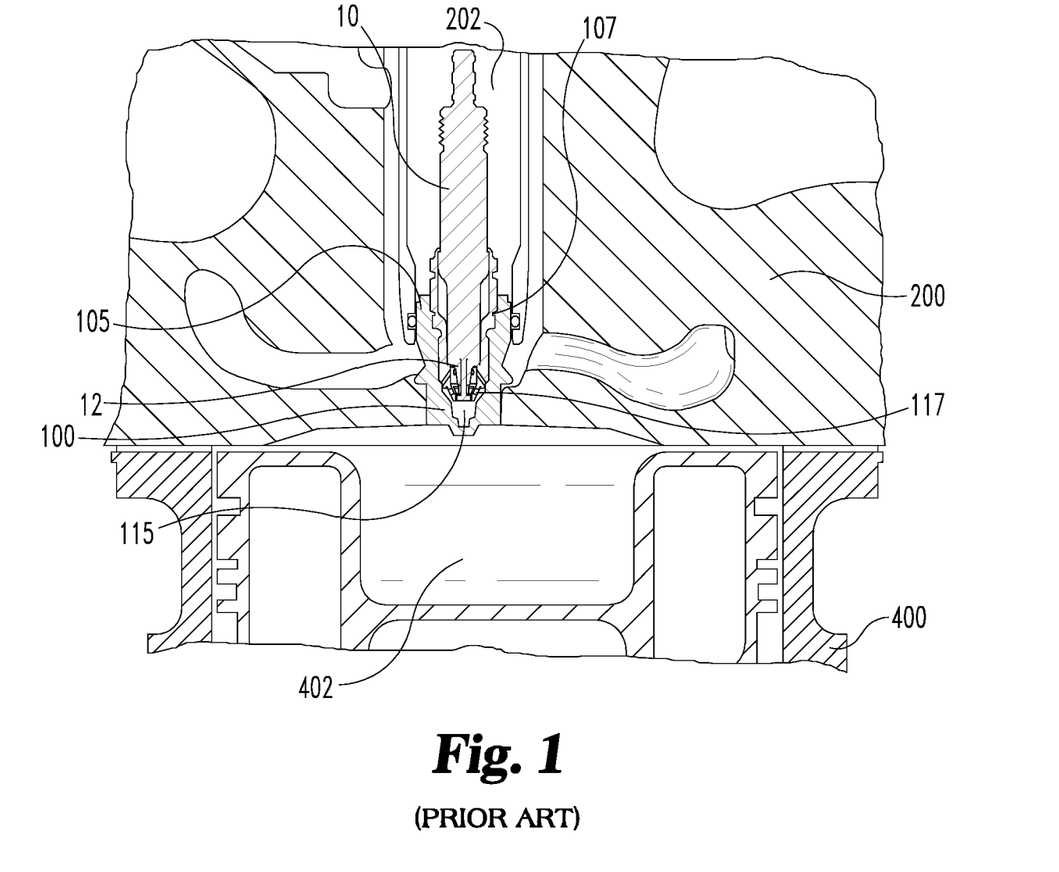
FIG. 1 is a cross-sectional side view of a prior art pre-chamber assembly installed in a cylinder head.

It is well documented that the use of combustion pre-chamber devices with spark plugs, such as shown in FIG. 1, in pre-chamber assemblies in a spark ignited, gaseous fueled, engine can result in an extended lambda (air/fuel ratio) range. Generally this allows the engine to be operated leaner than an open chamber system, resulting in lower NOx emissions while maintaining good cycle-to-cycle peak cylinder pressure variation. With these engines there is usually an operational trade-off between NOx emissions and fuel consumption. For applications that have higher NOx emissions requirements than others, better fuel consumption can be obtained by running the pre-chamber engine slightly richer (i.e., at a lower lambda value). Depending on the cost of fuel, this operation at a lower lambda value can offer substantial savings to the engine owner/operator.

Spark plugs are used in conjunction with various types of combustion chamber configurations to initiate a flame in a flammable fuel and air mixture. Some combustion chamber configurations include passive pre-chamber, open chamber, and fuel fed pre-chamber configurations. Pre-chambers are useful for initiating and propagating the combustion flame for pre-mixed gaseous-fueled engines. In particular, pre-chambers provide benefits as applied in lean-burn natural gas engines which can be difficult to ignite using conventional open chamber type configurations.

Passive pre-chambers include a combustion volume in which the spark plug is located. The combustion volume of the pre-chamber is linked to the main combustion chamber of the cylinder by the use of orifices or nozzles. The spark plugs include a central electrode and one or more outer ground or anode electrodes, which at least partially surround the central electrode to create a gap therebetween. The spark plug initiates a combustion event by generating a spark (e.g., an electron current) that spans the gap between the central electrode and one of the outer ground electrodes. More specifically, the spark initiates a flame that propagates through the pre-chamber volume. This combustion creates a sudden increase in pressure in the pre-chamber creating a large pressure difference across the orifices between the pre-chamber and main chamber. The pressure difference forces the flame to propel through the orifices into the main combustion chamber resulting in a successful combustion event.

After a successful combustion event, the residual exhaust gases in the main chamber are scavenged during the exhaust stroke of the piston within the cylinder. During the intake stroke, a fresh, pre-mixed air and fuel mixture (charge) is pulled into the main cylinder via an expansion event driven by the piston. However, some residual exhaust gases in the passive pre-chamber volume and between the spark plug electrodes are not completely scavenged and remain within the pre-chamber during the exhaust and intake strokes. During the subsequent compression stroke, the pressure difference between the main chamber and pre-chamber increases, forcing a fresh charge through the orifices into the pre-chamber, which compresses the residual exhaust gases towards the backside of the pre-chamber where the spark plug is located. The residual exhaust gases trapped in the area toward the back side of the pre-chamber, on the side opposite to the main chamber, can lead to pre-ignition and/or abnormal combustion, especially when the engine is operating at richer lambda (air/fuel ratio) ranges.

The residual gas trapped in the annular volume around the spark plug insulator nose may not be readily purged in subsequent combustion cycles and as a result can be heated to a temperature sufficient to cause pre-ignition, particularly when the engine is operated at richer lambda values. Fluid dynamics analysis shows low velocity in the spark plug annular volume nearest to the insulator nose at the rearmost portion of the pre-chamber volume. Output from $CO_2$ concentration analyses in a spark plug indicates evidence of unacceptably high levels of $CO_2$ residual gas remaining in the spark plug annular volume, particularly in zones near the base of the insulator nose. Output from temperature analyses measuring temperatures within various zones of the spark plug annular volume indicates evidence of high gas temperatures in the spark plug annular volume, especially near the base of the insulator nose, as a result of the lack of mixing or purging of the residual gas from the spark plug annular volume.

Improvements are needed in spark plugs to improve the purging of the residual gases in the annular spark plug volume and pre-chamber volume, thus extending the lambda operating range within which the engine may be advantageously operated.

SUMMARY

The subject matter of the present application has been developed in response to the present state of the art, and in particular, in response to the problems and needs in the spark plug and combustion pre-chamber art that have not yet been fully solved by currently available combustion pre-chamber and spark plug designs.

According to one embodiment as described herein, a spark plug is disclosed for use in a combustion pre-chamber assembly in a lean-burn, gaseous fueled, internal combustion engine. Various embodiments include a spark plug that is configured to improve the flow of fresh charge into the annular volume around the spark plug insulator nose to dilute or purge residual gases that are present in the annular volume. The various embodiments include arrangements in which the spacing between outer ground electrodes is increased by reducing the number of outer electrodes, arrangements in which the outer electrodes are shaped to increase the fresh charge flow into the annular volume, arrangements in which the outer electrode is shaped to convert the fresh charge flow into a swirling motion to purge residual gases from the annular volume, and combinations of two or more of these. These embodiments lower the gas temperature in the annular volume, which makes the spark plug more resistant to pre-ignition and/or abnormal combustion.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

In order that the advantages of the subject matter may be more readily understood, a more particular description of the subject matter briefly described above will be rendered by reference to certain embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

There is disclosed herein improved spark plug designs to allow for improved flow of fresh charge into the annular volume around the spark plug insulator. The improvements result in improved flow of fresh charge mix into the annular volume around the spark plug insulator, which dilutes or purges the residual gasses that are present from the previous cycle and delaying the onset of pre-ignition. The improvements have the effects of lowering the gas temperature in the annular volume, thus making the spark plug more resistant to pre-ignition and/or abnormal combustion. The improvements also result in extension of lambda (air/fuel ratio) operating range of engine, the pre-chamber, and/or the spark plug as used therein.

FIG. 1 shows a cross-sectional side view of an example prior art passive pre-chamber assembly mounted directly to the cylinder head 200 of an internal combustion engine. The cylinder head 200 of conventional internal combustion engines includes a plurality of spark plug recesses 202 for receiving a spark plug 10. Typically, the conventional spark plug is fitted within a respective recess 202 such that all or part of the cathode and anode electrodes of the conventional spark plug are positioned within (e.g., directly exposed to) a respective main combustion chamber 402 of the engine or cylinder block when the cylinder head 200 is mounted to the cylinder liner 400 that is supported in the engine block. The main combustion chamber 402 is fluidly coupled to an air-fuel mixture inlet for receiving an air-fuel mixture from air intake and fuel sources (not shown).

As shown in FIG. 1, a conventional spark plug may be connected with a passive pre-chamber device 100, which is fitted within the spark plug recess 202. The pre-chamber device 100 includes a body 105 that defines a pre-chamber volume 115. The pre-chamber volume 115 effectively spatially separates the spark plug (e.g., spark plug 10) from the main combustion chamber 402. The body 105 includes one or more orifices or nozzles in its distal end wall that fluidly connect the pre-chamber volume 115 with the main combustion chamber 402. As discussed above, the pre-chamber volume 115 facilitates the initiation and propagation of a combustion flame for the internal combustion engine. The body 105 may include connectors (e.g., external threads) matching or similar in dimensions the connectors (e.g., external threads) that are found on conventional spark plugs. The connectors of the body 105 mate with corresponding connectors (e.g., internal threads) formed within the spark plug recess 202 to secure the pre-chamber device 100 to the cylinder head 200. The body 105 includes a receptacle 107 configured to receive and retain a spark plug 10 within the body 105 such that the cathode and anode electrodes of the spark plug 10 are positioned within the pre-chamber volume 115.

The body 105 includes pre-chamber inlet apertures (not shown) for receiving the air-fuel mixture from the inlet of the cylinder head 200 into the pre-chamber volume 115. The pre-chamber volume 115 is in fluid communication with a gap 117 which is in the form of an annular space between the exterior surface of the spark plug 10 and the inner surface of the pre-chamber volume 115, the gap 117 being positioned toward a proximal portion of an electrode end portion 12 of the spark plug 10.

Figure 2:
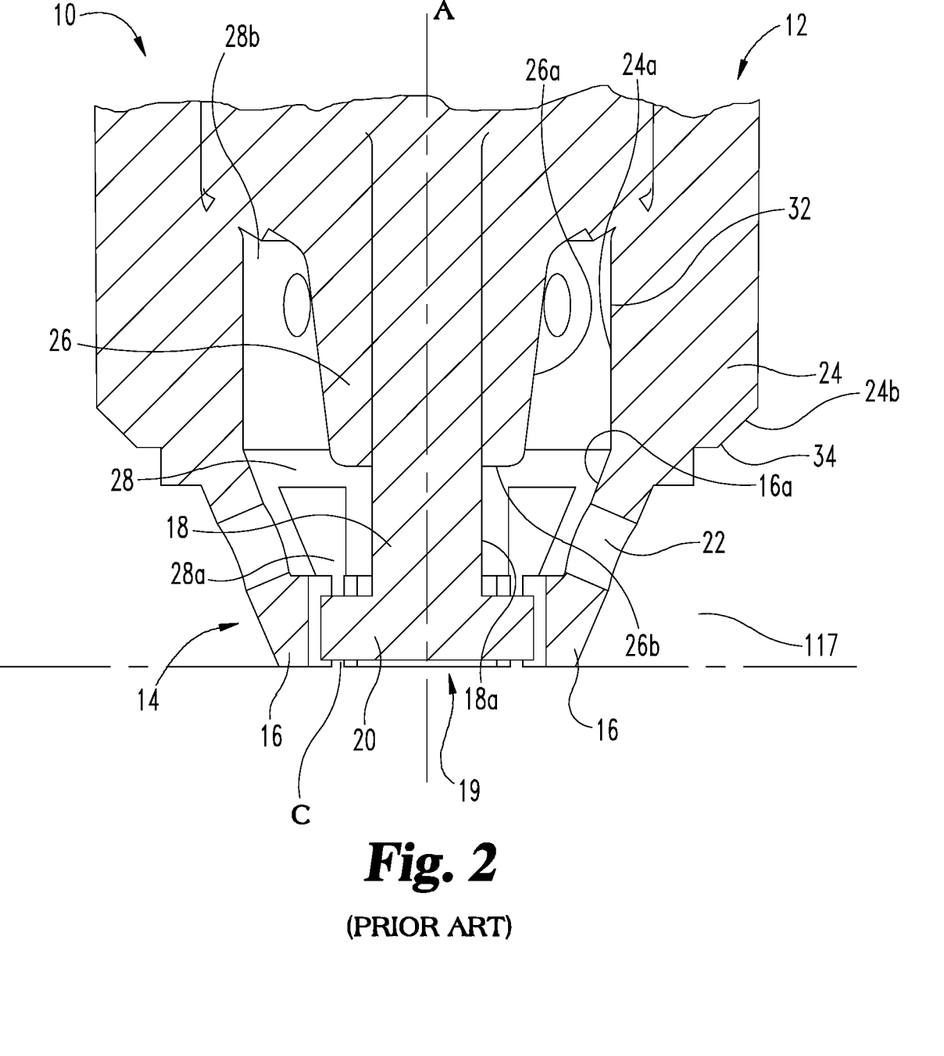
FIG. 2 is a cross-sectional side view of a prior art electrode end portion of a spark plug.

FIG. 2 is a cross-sectional side view of the electrode end portion 12 of the spark plug 10. The spark plug 10 includes an outer ground electrode portion 14 with a plurality of outer ground electrodes 16. The outer ground electrodes 16 can be defined as outer electrodes. Further, the spark plug 10 includes a central electrode 18 about which the outer electrodes 16 are positioned at a distal end 19 of the spark plug 10.

Generally, the outer electrodes 16 at least partially laterally surround or are positioned laterally about the central electrode 18. In other words, the outer electrodes 16 are radially outwardly spaced-apart from the central electrode 18, defining a space or gap between the central electrode 18 and the outer electrodes 16. The outer electrodes 16 extend from a proximal portion to the distal end 19 of the spark plug 10, adjacent a head 20 of the central electrode 18. The outer electrodes 16 may be angled radially inwardly toward a central longitudinal axis A of the spark plug 10 in a proximal to distal direction as shown in FIG. 2. The outer electrodes 16 may also each include an aperture 22 that facilitates the flow of fresh charge and exhaust gas into and out of the space defined between the central electrode 18 and the outer electrodes 16.

The spark plug 10 includes an outer shell 24 that surrounds the body of the spark plug 10, formed generally in a cylindrical shape at a proximal portion of the electrode end portion 14 of the spark plug 10 as shown in FIG. 2. The shell 24 ends at the proximal portion of the electrode end portion 14 such that the outer electrodes 16 are open to the pre-chamber volume 115. The spark plug 10 further includes an insulator including an insulator nose 26. The insulator nose 26 surrounds the central electrode 18 and generally is formed in the shape of a hollow tube surrounding the central electrode 18 and positioned to be concentric to the cylindrical shape of the body of the central electrode 18.

The inner surfaces of the preceding structures form a space within the spark plug 10 that is generally annular in shape. Specifically, as shown in FIG. 2, inner surface 16a of the outer electrodes 16, inner surface 24a of the shell 24, surface 26a of the insulator nose 26, and surface 18a of the central electrode 18 together form a boundary around an interior annular volume 28 that extends around insulator nose 26 inside the electrode end portion 12 of the spark plug 10. The annular volume 28 includes a front or distal portion 28a formed near the distal end 19 of the spark plug 10. The annular volume 28 further includes a rear or proximal portion 28b formed near the proximal portion of the electrode end portion 12 of the spark plug 10. The proximal portion 28b of annular volume 28 forms an annular space surrounding the proximal portion of the insulator nose 26.

Figure 3A:
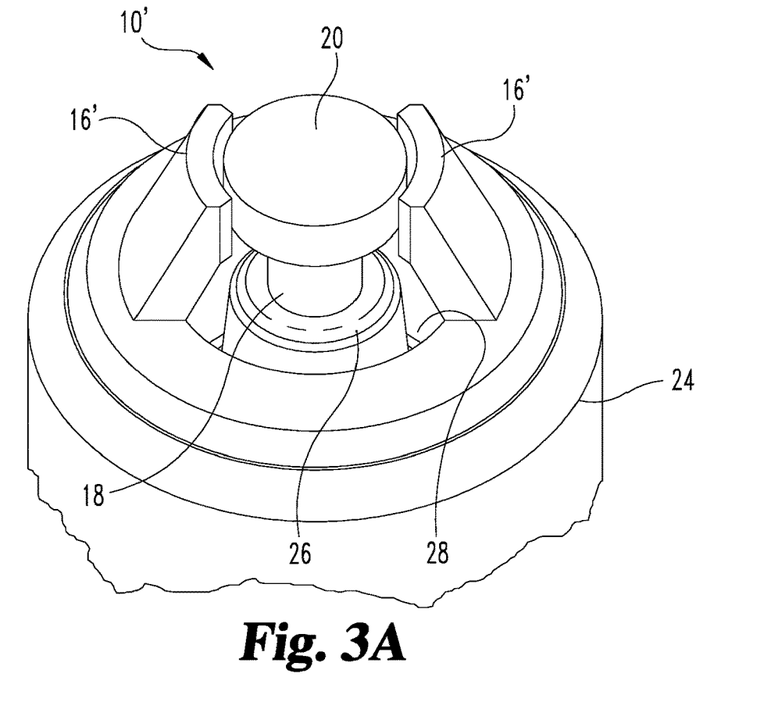
FIGS. 3A and 3B are perspective views of electrode end portions of a spark plug embodiment to increase a flow area between electrodes.
Figure 3B:
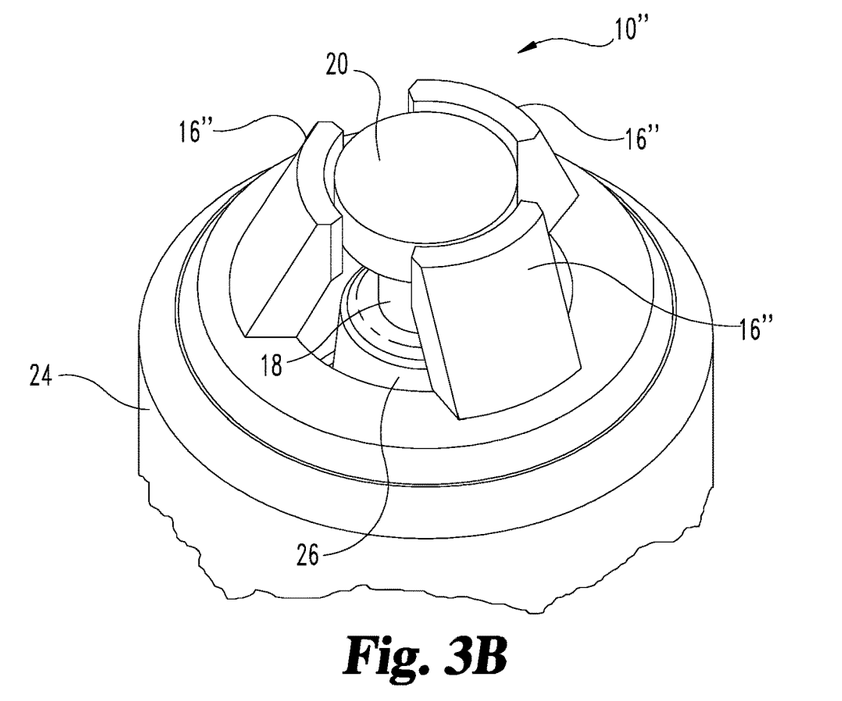

Referring now to FIGS. 3A and 3B, spark plugs 10' and 10" are illustrated in which the number of outer electrodes are reduced from the four outer electrodes shown in the prior art spark plug 10. In FIGS. 3A and 3B, components of the spark plugs 10' and 10" can be identical to spark plug 10 unless noted otherwise, and like components are designated with the same reference numerals. In particular, spark plug 10' in FIG. 3A includes two outer electrodes 16' positioned on opposite sides of the central electrode 18. Outer electrodes 16' are located 180 degrees opposite one another in the illustrated embodiment. The reduction in the number of electrodes from four to two increases the area of the flow path between electrodes 16' as compared to electrodes 16 of spark plug 10, allowing better purging of the annular volume 28 around insulator nose 26.

Spark plug 10" in FIG. 3B includes three outer electrodes 16" positioned around the central electrode 18. Outer electrodes 16" are located 120 degrees apart from one another in the illustrated embodiment. The reduction in the number of electrodes from four to three increases the area of the flow path between electrodes 16" as compared to electrodes 16 of spark plug 10, allowing better purging of the annular volume 28 around insulator nose 26. The three electrode arrangement also provides improved symmetry for applications in which the orientation of the spark plug is critical.

Figure 4A:
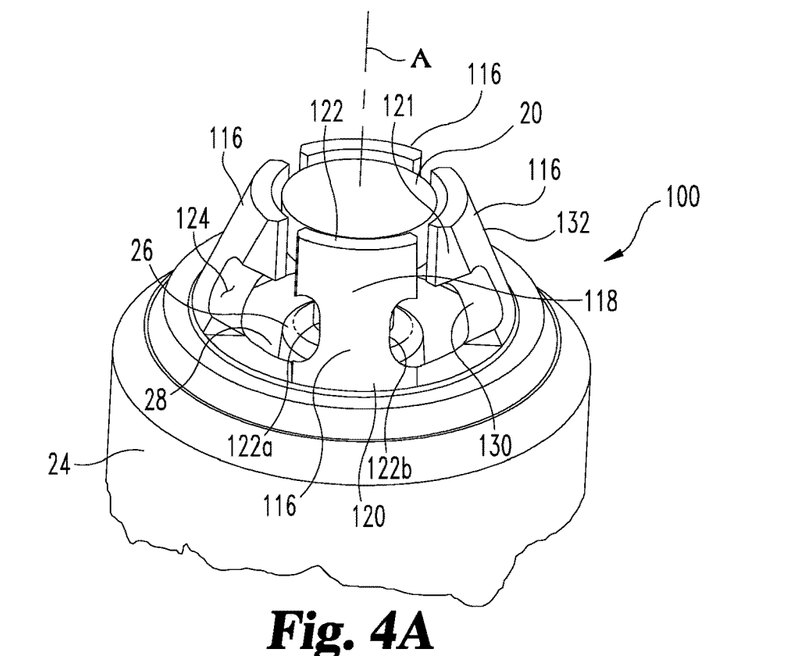
FIGS. 4A and 4B are perspective views of electrode end portions of a spark plug embodiment arranged to increase a flow area between electrodes and to further induce a swirl feature, respectively.

Referring to FIG. 4A, there is shown another embodiment spark plug 100 which includes another electrode arrangement to provide for increased charge air flow as compared to spark plug 10. Elements of spark plug 100 that are the same or similar to spark plug 10 are designated with the same reference numerals. Spark plug 100 includes four electrodes 116 each including a blade 118 that extends from a proximal end 120 to a distal end 122. Blade 118 includes opposite channels 122a, 122b in the sidewalls of blade 118 that provide for an increased flow area between adjacent electrodes 116 into and out of annular volume 28. Channels 122a, 122b are located closer to proximal end 120 than distal end 122 to be closer to the annular volume 28. The blade 118 has a T shape to provide a wider flow area and facilitate purging of residual exhaust gases in annular volume 28. The shape of the electrodes 116 can be adjusted to increase the heat transfer and flow area as compared to electrodes 16.

Figure 4B:
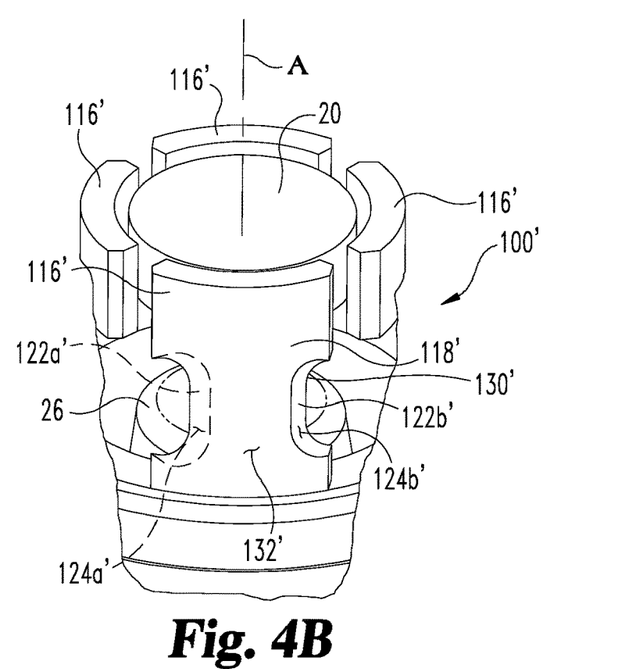

Referring to FIG. 4B, there is shown another embodiment spark plug 100' which includes an electrode arrangement to provide for increased charge air flow into annular volume 28 that is similar to spark plug 100, except the blade 118' of each electrode 116' includes swirl inducing surfaces 124a', 124b' along each of the channels 122a' 122b'. The opposite channels 122a', 122b' provide for both an increased flow area between adjacent electrodes 116' into and out of annular volume 28 and for generating a swirl flow in the annular volume 128 around insulator nose 126. The swirl flow improves removal of the residual exhaust gases. The dimensions and shape of the surfaces 124a' 124b' can be adjusted depending on the application.

Each outer or ground electrode 116 includes an outer surface 132 that extends from proximal end 120 to distal end 122 and is angled obliquely toward central longitudinal axis A in the distal direction. Inner surface 130 extends from proximal end 120 to a distally tapered end member 121 that is positioned adjacent to head 20 of central electrode 18. In one embodiment, the surfaces 124a, 124b of each channel 122a, 122b of spark plug 100 extends along a plane that intersects or nearly intersects central longitudinal axis A and is perpendicular or nearly perpendicular to the parallel inner and outer surfaces 130, 132 of the respective electrode 116. In contrast, the swirl inducing surfaces 124a', 124b' of spark plug 100' are arranged on a plane that does not intersect central longitudinal axis A, and these surfaces 124a', 124b' extend at an oblique angle to the inner and outer surfaces 130', 132' of the electrodes 116'.

Figure 5A:
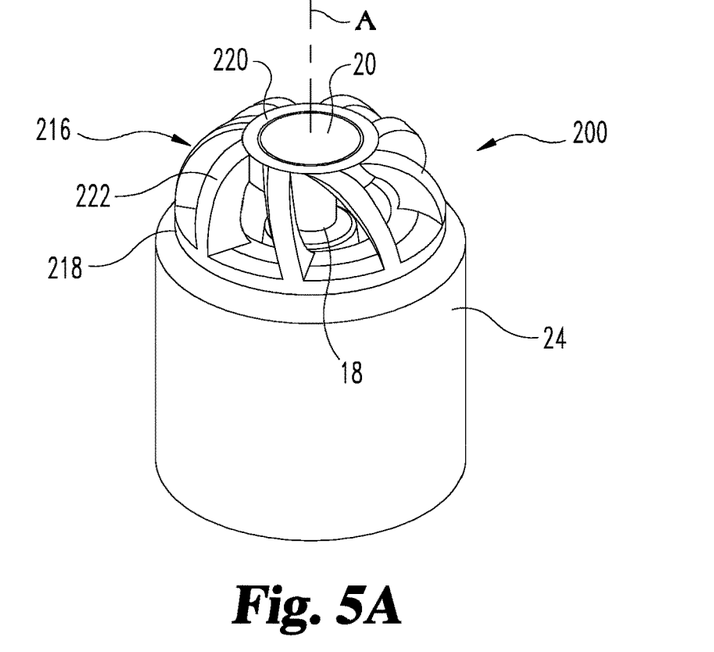
FIGS. 5A and 5B are perspective views of electrode end portions of another spark plug embodiment arranged to induce a swirl feature.
Figure 5B:
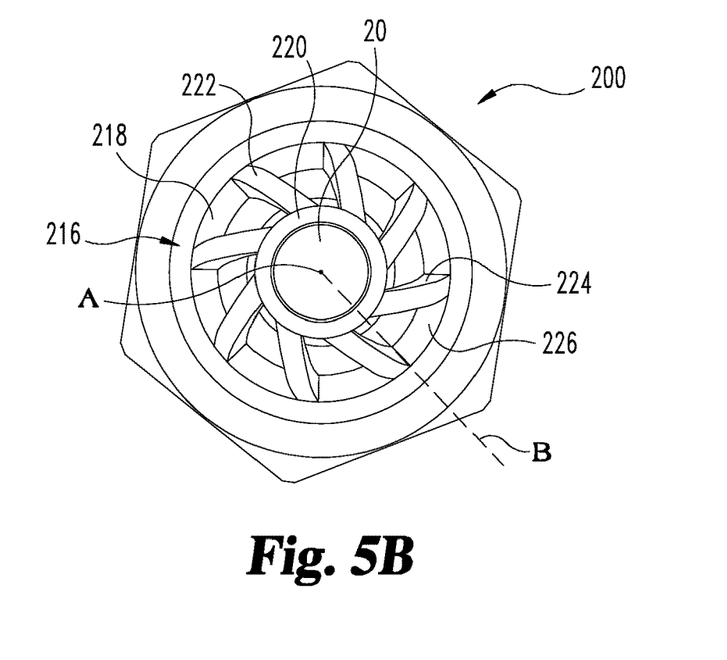

Referring to FIGS. 5A and 5B, another embodiment spark plug 200 is shown that includes another embodiment electrode arrangement in the form of electrode 216. Electrode 216 includes a proximal support member 218 supported on a distal end of shell 24 and a distal support member 220 extending around the head 20 of central electrode 18. A number of spirally oriented electrode blades 222 extend between and connect support members 218, 220 with gaps 226 formed between adjacent electrode blades 222. Each of the support members 218, 220 can be ring-shaped, although other shapes are not precluded.

As shown in FIG. 5B, each electrode blade 222 is oriented so that an inner part of the proximal end of electrode blade 222 lies on a line B extending radially outwardly from central longitudinal axis A. The remaining part of each electrode blade 222 is curved distally away from line B to distal ring member 220. The number of electrode blades 222 and spacing between blades 222 can be varied as may be needed based on the operating requirements and/or to produce the desired performance results. The blades 222 and/or the channels 122a', 122b' can be arranged to induce clockwise or counterclockwise swirl flow. The range of lambda values at which the engine may be operated increases, with less instances of pre-ignition and/or abnormal combustion.

As is evident from the figures and text presented above, a variety of aspects of the present disclosure are contemplated. For example, according to one aspect, a spark plug for an internal combustion engine is provided, The spark plug includes a distal end portion comprising a center electrode and at least one outer electrode and an insulator nose extending around the center electrode. The insulator nose has a distal end that is spaced proximally from a distal end of the center electrode and a shell extending around a body of the spark plug. The shell defines an annular volume around the insulator nose and the at least one outer electrode includes a blade extending between a proximal end and a distal end. The blade includes opposite channels extending into opposite sides of the blade that direct charge flow into and out of the annular volume.

In one embodiment, the at least one outer electrode includes four outer electrodes positioned around the center electrode and each of the four outer electrodes includes a pair of opposite channels formed in the blade thereof. In a refinement of this embodiment, each of the blades of the four outer electrodes is T-shaped.

In another embodiment, the body of the spark plug extends along a central longitudinal axis and the opposite channels in the blade each include a swirl inducing surface that extends along a plane that does not intersect the central longitudinal axis. In yet another embodiment, the blade of the at least one outer electrode includes an inner surface facing the center electrode and an opposite outer surface, and the opposite channels in the blade of the at least one outer electrode each include a swirl inducing surface that is obliquely oriented to the inner and outer surfaces of the blade.

According to another aspect, a spark plug for an internal combustion engine that includes a distal end portion comprising a center electrode and at least one outer electrode and an insulator nose extending around the center electrode. The insulator nose has a distal end that is spaced proximally from a distal end of the center electrode and a shell extending around a body of the spark plug. The shell defines an annular volume around the insulator nose. The at least one outer electrode includes a proximal support member adjacent a distal end of the shell, a distal support member around the center electrode, and a plurality of blade members extending between and connecting the proximal support member and the distal support member.

In one embodiment, the proximal support member and distal support member are ring-shaped. In another embodiment, the blade members are spirally oriented between the proximal and distal support members. In yet another embodiment, the blade members are curved between the proximal and distal support members. In a further embodiment, a gap is provided between each of the adjacent blade members.

According to another aspect, a spark plug for an internal combustion engine includes a first and second end portion, the first end portion including a center electrode and at least one outer electrode. The spark plug also includes an outer body extending between the first and second end portion and an insulator provided around a portion of the center electrode that is spaced apart from an inner portion of the outer body to form an annular space between the insulator and outer body. The at least one outer electrode includes a blade configured with a channel at opposite sides thereof to direct charge flow into and out of the annular space.

In an embodiment, the insulator extends along a central longitudinal axis of the spark plug. In another embodiment, the at least one outer electrode extends along a plane in a direction toward a central longitudinal axis of the spark plug that intersects with the central longitudinal axis. In yet another embodiment, the blade comprises a distal and proximal end and configured to extend between the distal and proximal end. In a refinement of this embodiment, the channel is provided between the distal end and the proximal end at the opposite sides of the blade. In a further refinement, the channel is positioned closer to the proximal end of the blade than the distal end to increase purging of residual exhaust gasses in the annular space.

In another embodiment, the blade includes an inner surface facing the center electrode and an opposite outer surface, and the channel in the blade includes a swirl inducing surface obliquely oriented to the inner and outer surfaces. In yet another embodiment, the channel includes a swirl inducing surface that extends along a plane that is parallel to the central longitudinal axis of the spark plug. In still another embodiment, the at least one electrode includes four electrodes positioned around the center electrode such that at least two of the four electrodes are spaced 180° opposite one another. In another embodiment, the blade is T-shaped.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A spark plug for an internal combustion engine, comprising:
 a distal end portion of the spark plug comprising a center electrode and at least two outer electrodes;

an insulator nose extending around the center electrode, the insulator nose having a distal end that is spaced proximally from a distal end of the center electrode;

a shell extending around a body of the spark plug, wherein the body of the spark plug extends along a central longitudinal axis, the shell defining an annular volume around the insulator nose, wherein each of the at least two outer electrodes is formed as a blade extending from a proximal portion of the distal end portion of the spark plug toward a distal end of the spark plug, each of the blades of the at least two outer electrodes includes opposite channels extending into opposite sidewalls of the blade, a channel of one of the at least two outer electrodes is adjacent to a channel of the other of the at least two outer electrodes, each channel of each blade configured with a swirl inducing surface to generate swirl flow and providing an increased flow area between the at least two outer electrodes, the channels are located closer to a proximal end of the at least two outer electrodes than a distal end of the at least two outer electrodes, to be closer to the annular volume, and the channels direct charge flow between the at least two outer electrodes into and out of the annular volume and a gap outside an outer surface of the at least two outer electrodes, wherein each swirl inducing surface includes a curved portion and a substantially planar portion, wherein the substantially planar portion is arranged on a plane that does not intersect the central longitudinal axis of the spark plug.

2. The spark plug of claim 1, wherein the spark plug comprises four outer electrodes formed as blades positioned around the center electrode and each of the four blades includes a pair of opposite channels formed in the opposite sidewalls of the blades.

3. The spark plug of claim 2, wherein each of the blades of the four outer electrodes is T-shaped.

4. The spark plug of claim 1, wherein each of the blades of the at least two outer electrodes includes an inner surface facing the center electrode and an opposite outer surface, and the plane of each swirl inducing surface is obliquely oriented to the inner and outer surfaces of the blade.

5. A spark plug for an internal combustion engine, comprising:
 a distal end portion comprising a center electrode and at least one outer electrode;
 an insulator nose extending around the center electrode, the insulator nose having a distal end that is spaced proximally from a distal end of the center electrode;
 a shell extending around a body of the spark plug, the shell defining an annular volume around the insulator nose; and
 the at least one outer electrode including a proximal support member adjacent a distal end of the shell, a distal support member around the center electrode, and a plurality of blade members extending between and connecting the proximal support member and the distal support member, wherein an inner part of a proximal end of at least one blade member lies on a line extending radially outwardly from a central longitudinal axis of the spark plug, and a remaining part of the at least one blade member is curved in a distal direction away from the line to the distal ring member.

6. The spark plug of claim 5, wherein the proximal support member and distal support member are ring-shaped.

7. The spark plug of claim 5, wherein the blade members are spirally oriented between the proximal and distal support members.

8. The spark plug of claim 5, wherein a gap is provided between each of the adjacent blade members.

9. A spark plug for an internal combustion engine, comprising:
 a first and second end portion, the first end portion including a center electrode and at least two outer electrodes;
 an outer body extending between the first and second end portion, and ending at a proximal portion of the first end portion; and
 an insulator provided around a portion of the center electrode and spaced apart from an inner portion of the outer body to form an annular space between the insulator and outer body,
 wherein each of the at least two outer electrodes is formed as a blade that extends from a proximal portion of the first end portion of the spark plug toward a distal end of the spark plug,
 each of the blades of the at least two outer electrodes includes an inner surface facing the center electrode and an opposite outer surface, and each blade is configured with opposite channels formed in opposite sidewalls of each of the blades, a channel of one of the at least two outer electrodes adjacent to a channel of the other of the at least two outer electrodes, each channel of each blade configured with a swirl inducing surface to generate swirl flow and providing an increased flow area between the at least two outer electrodes,
 the channels are located closer to a proximal end of the at least two outer electrodes than a distal end of the at least two outer electrodes to increase purging of residual exhaust gasses in the annular space,
 the channels direct charge flow between the at least two outer electrodes, into and out of the annular space and a gap outside an outer surface of the at least two outer electrodes, and
 wherein each swirl inducing surface includes a curved portion and a substantially planar portion, wherein the substantially planar portion is arranged on a plane obliquely oriented to the inner and outer surfaces of the blade.

10. The spark plug of claim 9, wherein the insulator extends along the central longitudinal axis of the spark plug.

11. The spark plug of claim 9, wherein the at least two outer electrodes extend along a second plane in a direction toward the central longitudinal axis of the spark plug that intersects with the central longitudinal axis.

12. The spark plug of claim 9, wherein the plane of the substantial planar portion of each swirl inducing surface is parallel to the central longitudinal axis of the spark plug.

13. The spark plug of claim 9, wherein the spark plug includes four outer electrodes positioned around the center electrode such that at least two of the four electrodes are spaced 180° opposite one another.

14. The spark plug of claim 9, wherein each of the blades is T-shaped.

* * * * *